US012797979B2

(12) United States Patent
Wang et al.

(10) Patent No.: US 12,797,979 B2
(45) Date of Patent: Nov. 17, 2026

(54) VIBRATION-CHISELING MACHINING METHOD

(71) Applicant: TSINGHUA UNIVERSITY, Beijing (CN)

(72) Inventors: Jianjian Wang, Beijing (CN); Pingfa Feng, Beijing (CN); Zhiwei Li, Beijing (CN); Jianfu Zhang, Beijing (CN); Dingwen Yu, Beijing (CN); Zhijun Wu, Beijing (CN); Kaiyue Wu, Beijing (CN); Zhongpeng Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 294 days.

(21) Appl. No.: 18/722,609

(22) PCT Filed: Oct. 26, 2023

(86) PCT No.: PCT/CN2023/126872
§ 371 (c)(1),
(2) Date: Jun. 21, 2024

(87) PCT Pub. No.: WO2024/159826
PCT Pub. Date: Aug. 8, 2024

(65) Prior Publication Data

US 2026/0158570 A1 Jun. 11, 2026

(30) Foreign Application Priority Data

Jan. 31, 2023 (CN) ......................... 202310118836.0
Feb. 22, 2023 (CN) ......................... 202310167268.3

(51) Int. Cl.
*B23D 79/00* (2006.01)

(52) U.S. Cl.
CPC .................................... *B23D 79/00* (2013.01)

(58) Field of Classification Search
CPC ...................................................... B23D 79/00
See application file for complete search history.

(56) References Cited

U.S. PATENT DOCUMENTS 4,640,156 A 2/1987 Nakagawa et al.
5,270,940 A * 12/1993 Shinozaki ........ G05B 19/40937 318/568.1

(Continued)

FOREIGN PATENT DOCUMENTS

CN 2889560 Y 4/2007
CN 102078967 A 6/2011

(Continued)

OTHER PUBLICATIONS

International Search Report dated Dec. 21, 2023 in International Application No. PCT/CN2023/126872.

(Continued)

*Primary Examiner* — Omar Flores Sanchez

(57) ABSTRACT

A vibration-chiseling machining method is provided. The method includes: obtaining a machining requirement of a current structure; determining a target cutter, a machining parameter, and a vibration trajectory and a vibration parameter of the target cutter based on the machining requirement of the current structure; and performing, based on the machining parameter, the vibration parameter, and the vibration trajectory, cutting on a surface of a workpiece to be machined through controlling the target cutter by a predetermined vibration device to obtain a microstructure satisfying the machining requirement of the current structure.

8 Claims, 5 Drawing Sheets

(56) References Cited

U.S. PATENT DOCUMENTS

| | | | | |
|---|---|---|---|---|
| 2002/0119021 | A1 | 8/2002 | Shamoto et al. | |
| 2002/0152851 | A1 | 10/2002 | Moriwaki et al. | |
| 2010/0086369 | A1* | 4/2010 | Subramanian | B23B 29/125 409/181 |
| 2023/0251619 | A1* | 8/2023 | Yang | B23C 3/13 700/159 |

FOREIGN PATENT DOCUMENTS

| | | | | |
|---|---|---|---|---|
| CN | 103394705 | A | 11/2013 | |
| CN | 104662194 | A | 5/2015 | |
| CN | 104959502 | A | 10/2015 | |
| CN | 105033290 | A | 11/2015 | |
| CN | 105312679 | A | 2/2016 | |
| CN | 106001611 | A | 10/2016 | |
| CN | 107322020 | A | 11/2017 | |
| CN | 107414095 | A | 12/2017 | |
| CN | 108274055 | A | 7/2018 | |
| CN | 110899731 | A | 3/2020 | |
| CN | 113334137 | A | 9/2021 | |
| CN | 113941872 | A | 1/2022 | |
| CN | 114603164 | A | 6/2022 | |
| CN | 114850964 | A | 8/2022 | |
| CN | 116021229 | A | 4/2023 | |
| CN | 116213838 | A | 6/2023 | |
| EP | 0104542 | B1 * | 3/1988 | G05B 19/4166 |
| JP | S5689447 | A | 7/1981 | |
| JP | H01271132 | A | 10/1989 | |
| JP | 2008221427 | A | 9/2008 | |

OTHER PUBLICATIONS

The Grant Notice from corresponding Chinese Application No. 202310118836.0, dated Mar. 13, 2024. English translation attached.

First Office Action dated Jun. 26, 2025 received in corresponding patent family application No. CN202310167268.3. English translation attached.

* cited by examiner

VIBRATION-CHISELING MACHINING METHOD

CROSS-REFERENCE TO RELATED APPLICATIONS

This application is a national phase application of PCT international patent application PCT/CN2023/126872, filed on Oct. 26, 2023 which claims priority to Chinese Patent Applications No. 202310118836.0 filed on Jan. 31, 2023, and No. 202310167268.3 filed on Feb. 22, 2023, the entire disclosure of which are incorporated herein by reference.

FIELD

The present disclosure relates to the technical field of mechanical manufacturing, in particular, to a vibration-chiseling machining method.

BACKGROUND

A metal surface microstructure has extensive applications in various fields, with notable engineering applications including an enhanced heat exchange surface, an anti-icing surface, a bio-antibacterial surface, and an optical sensor mold. A structured metal V-slot surface having a microstructure with a high depth-to-width ratio can significantly enhance heat exchange parameters of the metal surface, including critical heat flux density and heat transfer coefficient, facilitate convection heat exchange on the surface, and can be used in a heat pipe, a condenser, and other heat dissipation elements. A microstructure of a metal micro-post surface with a multilevel scale structure can dramatically improve anti-icing performance of the surface, reduce ice formation from water vapor condensation, affect use performance of the surface, and can be used in surfaces like aero-engines and wings. A microstructure of a uniform metal micro-rib surface can greatly increase antibacterial performance of the metal surface, prolong surface service time, reduce corrosion, and can be used at a surface of a marine ship, a surface of an underwater detector, and other surfaces. A microstructure at a surface of a uniform metal slot can form a metal grating, which may be used as a mold to reproduce a surface of PDMS resin serving as an optical stress sensor. These reproduced surfaces can exhibit different colors as stress changes, making them applicable to various types of sensors.

In the related art, the machining methods commonly used for machining the metal surface microstructures may be categorized as non-mechanical machining and mechanical machining. A non-mechanical machining method includes photoetching, femtosecond laser, metal 3D printing, micro-EDM, and the like. A mechanical machining method includes cutter servo cutting, micro-milling, fly cutting, grinding, and vibration cutting.

However, the method has limitations in efficient, high-flexible, large-batch, and cost-effective manufacturing of the metal surface microstructure. In addition, there is still currently no reliable and effective solution for manufacturing a large-scale high depth-to-width ratio metal surface microstructure, which urgently needs to be addressed.

SUMMARY

The present disclosure provides a vibration-chiseling machining method, aiming to solve problems where the machining method has limitations in efficient, high-flexible, large-batch, and cost-effective manufacturing of a metal surface microstructure currently, and where a reliable and resultful solution for manufacturing a large-scale high depth-to-width ratio metal surface microstructure is lacked, and the like. Therefore, machining efficiency is improved, machining effects are strengthened, and costs are lowered.

According to embodiments of the present disclosure, provided is a vibration-chiseling machining method, including:

- obtaining a machining requirement of a current structure;
- determining a target cutter, a machining parameter, and a vibration trajectory and a vibration parameter of the target cutter based on the machining requirement of the current structure; and
- performing, based on the machining parameter, the vibration parameter, and the vibration trajectory, cutting on a surface of a workpiece to be machined through controlling the target cutter by a predetermined vibration device to obtain a microstructure satisfying the machining requirement of the current structure.

Optionally, in some embodiments, the machining requirement of the current structure includes at least one of a micro-post structure, a microfiber structure, a micro-V-shaped groove structure, a micro-rib structure, and a micro-pyramid structure.

Optionally, in some embodiments, when the machining requirement of the current structure is the micro-post structure, said performing, based on the machining parameter, the vibration parameter, and the vibration trajectory, cutting on the surface of the workpiece to be machined through controlling the target cutter by the predetermined vibration device to obtain the microstructure satisfying the machining requirement of the current structure includes: cutting, by the target cutter, into the surface of the workpiece to be machined and chiseling, by the target cutter, cutting chips to form a uniform micro-post structure in each vibration period, wherein:

- a vibration direction of the target cutter is perpendicular to a cutting feed direction of the target cutter during machining; and
- the vibration trajectory of the target cutter is along a straight line.

Optionally, in some embodiments, when the machining requirement of the current structure is the micro-rib structure, said performing, based on the machining parameter, the vibration parameter, and the vibration trajectory, cutting on the surface of the workpiece to be machined through controlling the target cutter by the predetermined vibration device to obtain the microstructure satisfying the machining requirement of the current structure includes: cutting, by the target cutter, into the surface of the workpiece to be machined and chiseling, by the target cutter, cutting chips to form a uniform micro-rib structure in each vibration period, wherein:

- the vibration direction of the target cutter is opposite to the cutting feed direction of the target cutter during machining; and
- the vibration trajectory of the target cutter is an elliptical trajectory or a profiled trajectory.

Optionally, in some embodiments, when the machining requirement of the current structure is the microfiber structure, the method further includes, subsequent to chiseling the cutting chips to form the uniform micro-post structure or the uniform micro-rib structure:

- determining a new vibration trajectory and a new vibration parameter of the target cutter, and forming a particulate structure based on a detached micro-post structure and the microfiber structure based on a detached micro-rib structure.

Optionally, in some embodiments, when the machining requirement of the current structure is the micro-V-shaped groove structure, the method further includes, subsequent to chiseling the cutting chips to form the uniform micro-post structure or the uniform micro-rib structure:

forming, based on a predetermined profiling cutting scheme, the micro-V-shaped groove structure by transversely scoring a surface of the micro-post structure or a surface of the micro-rib structure.

Optionally, in some embodiments, the method further includes, subsequent to chiseling the cutting chips to form the uniform micro-post structure or the uniform micro-rib structure:

forming, based on the predetermined profiling cutting scheme, the micro-pyramid structure by first transversely scoring and then longitudinally scoring the surface of the micro-post structure or the surface of the micro-rib structure.

Optionally, in some embodiments, the target cutter includes, but is not limited to, a diamond cutter.

Optionally, in some embodiments, the machining parameter includes at least one of a cutting speed, a cutting depth, and a cutting width.

Optionally, in some embodiments, the vibration trajectory is at least one of the elliptical trajectory, an oblique trajectory, and a parallelogram trajectory; and the vibration parameter includes at least one of a vibration frequency, a vibration amplitude, a vibration direction, and a vibration phase.

With the vibration-chiseling machining method according to the embodiments of the present disclosure, the target cutter, the machining parameter, and the vibration trajectory and the vibration parameter of the target cutter may be determined based on the machining requirement of the current structure, and cutting is performed on the surface of the workpiece to be machined through controlling the target cutter by the predetermined vibration device based on the machining parameter, the vibration parameter, and the vibration trajectory, to obtain the microstructure satisfying the machining requirement of the current structure. Therefore, the vibration-chiseling machining method solves problems where the machining method has limitations in the efficient, high-flexible, large-batch, and cost-effective manufacturing of the metal surface microstructure currently, and where the reliable and resultful solution for manufacturing the large-scale high depth-to-width ratio metal surface microstructure is lacked, and the like. Therefore, the machining efficiency is improved and the machining effect is strengthened. Meanwhile, the costs are lowered.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become apparent and readily appreciated from the following description of the embodiments in conjunction with the accompanying drawings, in which.

REFERENCE NUMERALS

Figure 1:
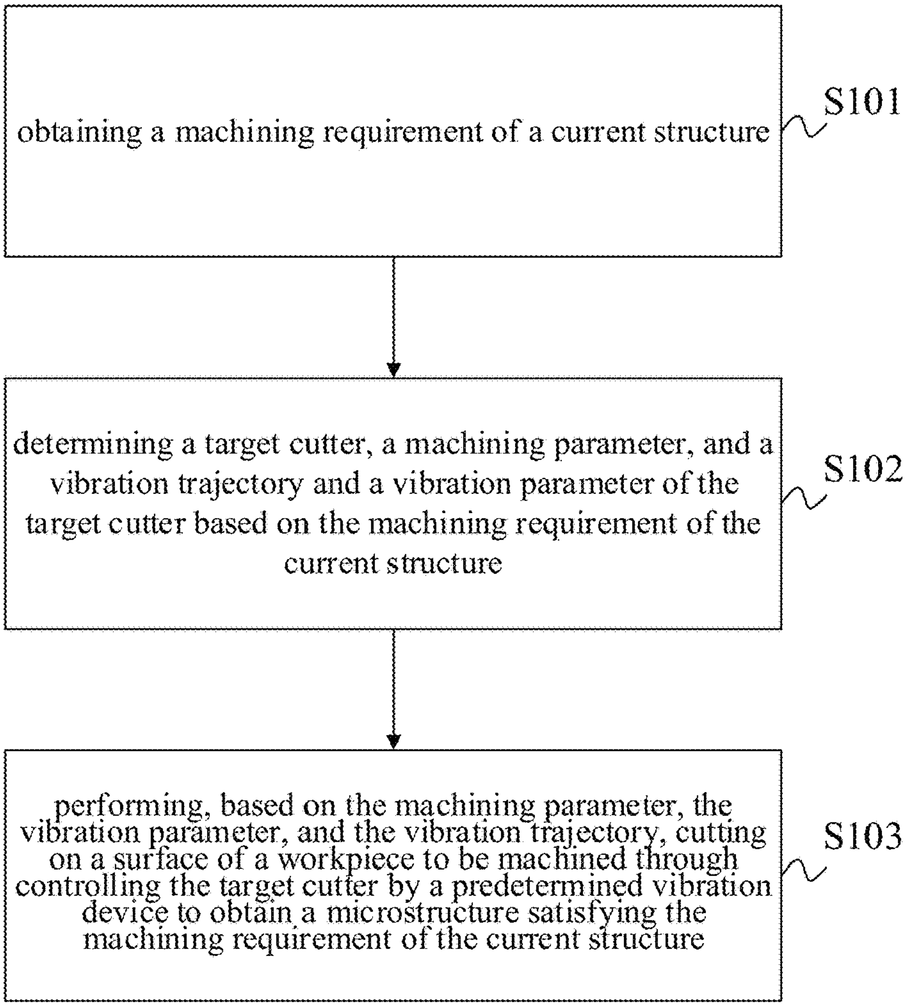
FIG. 1 is a flowchart of a vibration-chiseling machining method according to an embodiment of the present disclosure.

1: high-amplitude high-frequency resonance device, 11: target cutter, 12: resonator, 13: piezoelectric ring, 14: electrode, 15: fastening nut, 16: base; 2: large-amplitude non-resonance device, 21: tail cap, 22: vibration body, 23: piezoelectric stack, 24: ball head bolt, 25: nut, 26: connector; 31: elliptical trajectory, 32: profiled trajectory, 33: inclined linear trajectory; 4: workpiece, 41: micro-rib structure, 42: microfiber structure, 43: micro-post structure.

DETAILED DESCRIPTION

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A vibration-chiseling machining method according to embodiments of the present disclosure will be described below with reference to the drawings.

FIG. 1 is a flowchart of a vibration-chiseling machining method according to an embodiment of the present disclosure.

Before introducing the vibration-chiseling machining method proposed in the embodiments of the present disclosure, a machining method commonly used for machining a metal surface microstructure in the related art is introduced first.

In the related art, the machining method commonly used for machining the metal surface microstructure may be divided into non-mechanical machining and mechanical machining.

Here, (1) a non-mechanical machining method includes photoetching, femtosecond laser, metal 3D printing, micro-EDM, and the like. The photoetching is a commonly used method for efficiently machining various surface microstructures, but mainly aims at a silicon-based material and a polymer. However, because of high device costs and complex planar machining technic process, for a large-scale metal surface microstructure, the photoetching machining is time-consuming, strenuous, and expensive. The femtosecond laser can prepare microstructures on surfaces of various metal materials, but high efficiency and high precision may not be simultaneously achieved due to limitations in light spots and machining power. The metal 3D printing may machine metal surface microstructures in arbitrary geometric shapes and has the characteristic of high flexibility. However, the metal 3D printing has low efficiency, preventing large-scale manufacturing. The micro-EDM can machine a metal surface microstructure with a high depth-to-width ratio, but its further industrial applications are hindered by low efficiency and a small area for machining the metal surface microstructure.

(2) The mechanical machining method includes cutter servo cutting, micro-milling, fly-cutting, grinding, vibration cutting, and the like. The servo cutting machining using a single-point diamond cutter can machine metal surface microstructures like a micro-lens array with high precision and high quality but has the disadvantages of low efficiency and small scale. The micro-milling may efficiently machine various kinds of metal surface microstructures, including hollows and rib plates. However, a diameter of a milling cutter restricts a size of a micro-structure that can be machined by micro-milling. The fly-cutting machining is capable of machining a uniform layered metal surface microstructure but faces challenges in machining the metal surface microstructure with a high depth-to-width ratio. The grinding machining is suitable for machining micro-structures like micro-posts and micro-slots on difficult-to-cut materials. However, because of a size limitation of a grinding tool, the structure has a small high depth-to-width ratio. A traditional vibration-cutting method can efficiently and effectively machine diverse multiscale structures. However, a depth-to-width ratio of the microstructure of the machined metal surface is very limited and cannot satisfy practical requirements.

It is evident that the aforementioned methods have their merits and drawbacks. However, there are limitations in efficient, high-flexible, large-batch, and cost-effective manufacturing of the metal surface microstructure. In addition, a reliable and resultful solution is still currently lacked for manufacturing a large-scale metal surface microstructure with a high depth-to-width ratio.

Based on the above problems, the present disclosure provides a vibration-chiseling machining method, which can generate a predetermined and specified vibration trajectory by means of a vibration device, regulate and control each machining parameter and direction, thereby realizing high-efficiency, high-flexible, large-batch, low-cost, and high depth-to-width ratio manufacturing of metal surface microstructures such as a micro-post structure, a microfiber structure, a micro-V-shaped groove structure, a micro-rib structure, and a micro-pyramid structure. The term "high-efficiency" means that, compared with other methods, a high vibration frequency during machining of the vibration-chiseling machining method can prepare various metal surface microstructures in one step for a short time. The term "high-flexible" means that metal surface microstructures that can be machined by the vibration-chiseling machining method have diverse types and easily adjustable shapes and parameters. The term "large-batch" indicates that the vibration-chiseling machining method is convenient in large-scale industry applications and is reliable and stable. The term "low-cost" refers to that the device used in the vibration-chiseling machining method is low in price, simple and convenient to machine, and is low in machining cost, safe and environment-friendly than similar microstructures. Compared with other mechanical machining methods, the term "high depth-to-width ratio" means that the metal surface microstructure machined through the vibration-chiseling machining method has a remarkable increase in a structure depth-to-width ratio by ten times at the micron scale and the characteristic of high depth-to-width ratio.

Exemplarily, as illustrated in FIG. 1, the vibration-chiseling machining method includes actions at blocks S101 to S103.

At block S101, a machining requirement of a current structure is obtained.

Here, in some embodiments, the current structural machining requirement includes at least one of a micro-post structure, a microfiber structure, a micro-V-shaped groove structure, a micro-rib structure, and a micro-pyramid structure.

It should be noted that the core of the vibration-chiseling machining method according to the embodiments of the present disclosure lies in the matching of the trajectory and the structure. The target cutter chisels chips that form a microstructure. These microstructures can either remain detach or non-detach. For the non-detached microstructures, they can form a micro-post structure and a micro-rib structure. The detached microstructures can form a microfiber structure, or the like. Depending on different structural machining requirements, the vibration trajectory may be freely adjusted through the cutter.

At block S102, a target cutter, a machining parameter, and a vibration trajectory and a vibration parameter of the target cutter are determined based on the machining requirement of the current structure.

Here, in some embodiments, the target cutter may be, but is not limited to, a diamond cutter. The machining parameter includes at least one of a cutting speed, a cutting depth, and a cutting width. The vibration trajectory is at least one of an elliptical trajectory, an oblique trajectory, and a parallelogram trajectory. The vibration parameter includes at least one of a vibration frequency, a vibration amplitude, a vibration direction, and a vibration phase.

In some embodiments of the present disclosure, in the embodiments of the present disclosure, the target cutter may be, but is not limited to, a diamond cutter. The machining parameters include a cutting speed, a cutting depth, and a cutting width. The vibration trajectory applied to the target cutter may be an elliptical trajectory, an oblique trajectory, or a parallelogram trajectory. The vibration parameter includes a vibration frequency, a vibration amplitude, a vibration direction, and a vibration phase. It is possible to improve machining efficiency by enhancing the vibration frequency of the cutter.

At block S103, cutting is performed on a surface of a workpiece to be machined through controlling the target cutter by a predetermined vibration device based on the machining parameter, the vibration parameter, and the vibration trajectory, to obtain a microstructure satisfying the machining requirement of the current structure.

It can be understood that, in order to obtain a freely controllable and highly flexible metal surface microstructure, a machining vibration device is essential. According to the embodiments of the present disclosure, the predetermined vibration device is used to control the target cutter to perform cutting on the surface of the workpiece to be machined. The predetermined vibration device may be any device capable of implementing the vibration-chiseling machining of the present disclosure, which is not specifically limited herein. Preferably, the embodiments of the present disclosure are described by taking a large-amplitude high-frequency resonance device and a large-amplitude non-resonance device as examples. The large-amplitude non-resonance device has a use frequency within 6000 Hz and an amplitude greater than 20 microns, which can be used for preliminary experimental verification. The large-amplitude high-frequency resonance device operates at a resonant frequency of 30000 Hz with an amplitude greater than 15 microns and can be used for large-scale metal surface microstructure machining experiments.

Figure 2:
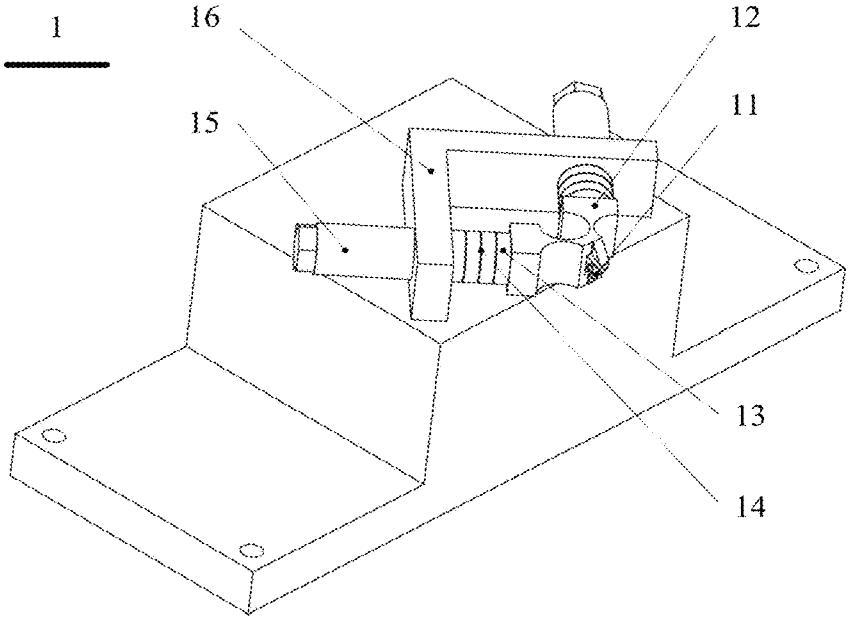
FIG. 2 is a schematic diagram of a large-amplitude high-frequency resonance device according to an embodiment of the present disclosure.

In some embodiments of the present disclosure, a large-amplitude high-frequency resonance device 1 is illustrated in FIG. 2. A base 16 may be fixed on a machine tool. A piezoelectric ring 13 and an electrode 14 are fixed on the base 16 by a fastening nut 15. A resonator 12, serving as a vibration core component, is driven by the piezoelectric ring 13. A target cutter 11 is fixed at a tip of the resonator 12 by a machining screw. A hinge design, position selection, and size design of the resonator 12 are critical problems. In order to ensure that the resonator 12 can output a stable high-frequency vibration, its left and right handles should have high stiffness and can fully enclose the piezoelectric ring 13. A middle of the resonator 12, serving as a motion coupling position, has a flexible hinge with moderate rigidity, which ensures that a movement of the left handle and a movement of the right handle do not interfere with each other, and can realize correct coupling for elliptical motion. A use resonance frequency of the device is 30000 Hz, which can output any high-frequency elliptical trajectory with an amplitude within 15 microns.

Figure 3:
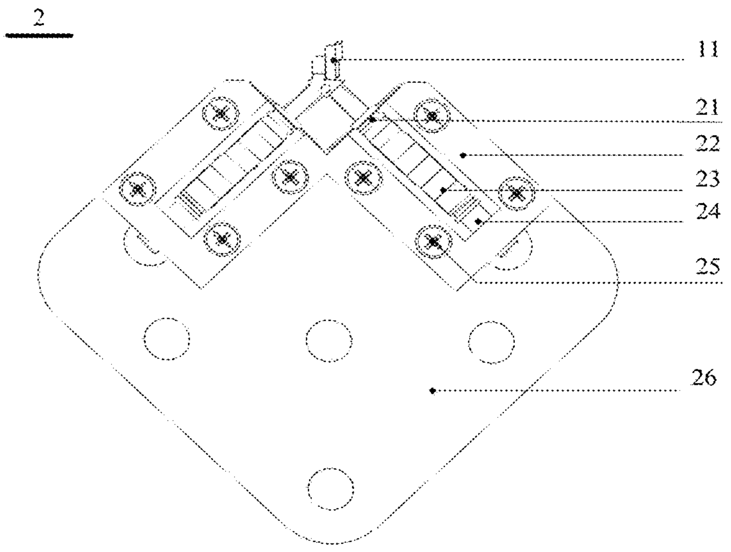
FIG. 3 is a schematic diagram of a large-amplitude non-resonance device according to an embodiment of the present disclosure.

The large-amplitude non-resonance device 2 is illustrated in FIG. 3. A connector 26 may be fixed on the machine tool. The target cutter 11 is disposed at a head of a vibration body 22. The vibration body 22 couples a vibration of a piezoelectric stack 23 to a head of the device through a flexible bridge structure, allowing the target cutter 11 to form a complex trajectory. The piezoelectric stack 23 is fixed in the vibration body 22 by fixing a tail cap 21 and a ball head bolt 24, to ensure concentricity and stable vibrations. The vibration body 22 is fixed onto the connector 26 through a nut 25. By adjusting a flexible bridge structure of an amplification device, the amplification device has a maximum amplitude that can exceed 30 microns and a use frequency within 6000 Hz, so that any elliptical trajectory with an amplitude within 30 microns can be output.

Figure 4:
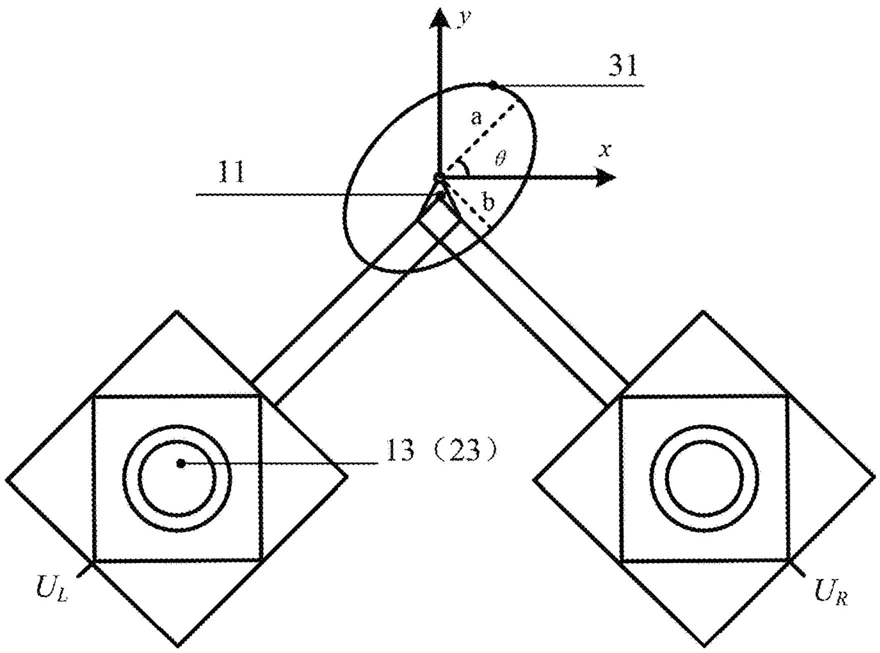
FIG. 4 is a schematic diagram of a trajectory modulation model of a dual-excitation device according to an embodiment of the present disclosure.

For the vibration device in FIG. 2 and FIG. 3, input-output and control relationship and model of a dual-excitation elliptical ultrasonic vibration device with universality are illustrated in FIG. 4. Overall, the piezoelectric ring 13 (or piezoelectric stack 23) outputs vibrations to the target cutter 11, resulting in an elliptical vibration trajectory. At this time, $U_L$ represents an input voltage of an external driving device in an x-axis direction, $U_R$ represents an input voltage of the external driving device in a y-axis direction, which may be a sinusoidal voltage; X and Y respectively represent sinusoidal displacements of the target cutter in the x-axis direction and the y-axis direction; a represents a semi-major axis of an ellipse; b represents a semi-minor axis of the ellipse; and θ represents an angle between the semi-major axis and the x-axis direction. The sinusoidal voltages $U_L$ and $U_R$ and their phase angles $\varphi_L$ and $\varphi_R$ are inputted, to drive the piezoelectric stack 23 to generate and output the sinusoidal displacements X and Y and their phase angles $\varphi_x$ and $\varphi_y$, respectively. The sinusoidal displacements are outputted to form elliptical vibrations through coupling to generate elliptical vibrations x and y, resulting in the formation of an elliptical trajectory 31.

When the vibration device is driven by dual piezoelectric rings 13 (or piezoelectric stacks 23) at an angle of 90°, the parameters $U_L$, $U_R$, $\varphi_L$, and $\varphi_R$ are inputted and displacements X, Y, $\varphi_x$, and $\varphi_y$ are outputted, and an expression for the elliptical trajectory 31 is:

$$\begin{bmatrix} x \\ y \end{bmatrix} = \begin{bmatrix} Xe^{j\varphi_x} \\ Ye^{j\varphi_y} \end{bmatrix} = \begin{bmatrix} A_{xL}e^{j\delta_{xL}} & -A_{xR}e^{j\delta_{xR}} \\ A_{yL}e^{j\delta_{yL}} & A_{yR}e^{j\delta_{yR}} \end{bmatrix} \begin{bmatrix} U_L e^{j\phi_L} \\ U_R e^{j\phi_R} \end{bmatrix}$$

where $A_{xL}$, $A_{xR}$, $A_{yL}$, and $A_{yR}$ respectively represent an amplitude transfer coefficient between an output vibration driven by the dual piezoelectric stacks and an inputted electrical signal, $\delta_{xL}$, $\delta_{yL}$, $\delta_{yR}$, and $\delta_{xR}$ respectively represent a phase difference between an output vibration each corresponding to $A_{xL}$, $A_{xR}$, $A_{yL}$, and $A_{yR}$ and the inputted electrical signal.

It should be noted that, in the above parameters, $\delta_{xL}$, $\delta_{yL}$, $\delta_{yR}$, and $\delta_{xR}$ and $A_{xL}$, $A_{xR}$, $A_{yL}$, and $A_{yR}$ are each determined by the characteristics of the vibration device itself and can be obtained through experiments.

Conversely, the elliptical trajectory 31 may also calculate the input parameters, a, b, and θ of the elliptical vibration trajectory, output displacements X, Y, $\varphi_x$, and $\varphi_y$, and input parameters $U_L$, $U_R$, $\varphi_L$, and $\varphi_R$ as the following formula.

$$\begin{bmatrix} X \\ Y \\ \varphi_x \\ \varphi_y \end{bmatrix} = \begin{bmatrix} \sqrt{(a\cos\theta)^2 + (b\sin\theta)^2} \\ \sqrt{(a\sin\theta)^2 + (b\cos\theta)^2} \\ \tan^{-1}\dfrac{-b\tan\theta}{a} \\ \tan^{-1}\dfrac{-a\tan\theta}{b} \end{bmatrix}$$

Inversion is performed on a relationship matrix containing the amplitude transfer coefficient and the phase difference, to obtain the following formula.

$$\begin{bmatrix} A_{xL}e^{j\delta_{xL}} & -A_{xR}e^{j\delta_{xR}} \\ A_{yL}e^{j\delta_{yL}} & A_{yR}e^{j\delta_{yR}} \end{bmatrix}^{-1} = \begin{bmatrix} k_1e^{j\delta_1} & k_2e^{j\delta_2} \\ k_3e^{j\delta_3} & k_4e^{j\delta_4} \end{bmatrix}$$

As described above, it can be calculated as:

$$\begin{bmatrix} U_L \\ U_R \\ \phi \end{bmatrix} = \begin{bmatrix} \sqrt{(k_1X)^2 + (k_2Y)^2 + 2k_1k_2XY\cos(\varphi_x + \delta_1 - \varphi_y - \delta_2)} \\ \sqrt{(k_3X)^2 + (k_4Y)^2 + 2k_3k_4XY\cos(\varphi_x + \delta_1 - \varphi_y - \delta_2)} \\ \tan^{-1}\dfrac{k_1X\sin(\varphi_x + \delta_1) + k_2Y\sin(\varphi_y + \delta_2)}{k_1X\cos(\varphi_x + \delta_1) + k_2Y\cos(\varphi_y + \delta_2)} - \tan^{-1}\dfrac{k_3X\sin(\varphi_x + \delta_1) + k_4Y\sin(\varphi_y + \delta_2)}{k_3X\cos(\varphi_x + \delta_1) + k_3Y\cos(\varphi_y + \delta_2)} \end{bmatrix}$$

where $\delta_1$, $\delta_2$, $\delta_3$, and $\delta_4$ respectively represent parameters of a phase difference between the output vibration after matrix inversion and the inputted electrical signal, $k_1$, $k_2$, $k_3$, and $k_4$ respectively represent parameters of an amplitude transfer coefficient after matrix inversion. Finally, a specific elliptical trajectory vibration may be applied to the target cutter according to the above relationship.

Simultaneously, the reverse calculation of each parameter is as follows:

$$\begin{bmatrix} \theta \\ a \\ b \end{bmatrix} = \begin{bmatrix} \tan^{-1}\sqrt{\tan\varphi_x * \tan\varphi_y} \\ \dfrac{Y}{\sqrt{\dfrac{\sin^2\theta}{\tan^2\varphi_y} + \sin^2\theta}} \\ \dfrac{X}{\sqrt{\dfrac{\sin^2\theta}{\tan^2\varphi_x} + \sin^2\theta}} \end{bmatrix}$$

The trajectory modulation model may be used to perform any trajectory modulation in the predetermined vibration device provided by the embodiments of the present disclosure. Such modulation may be selected as the current requirement for machining the metal surface microstructure.

Figure 5:
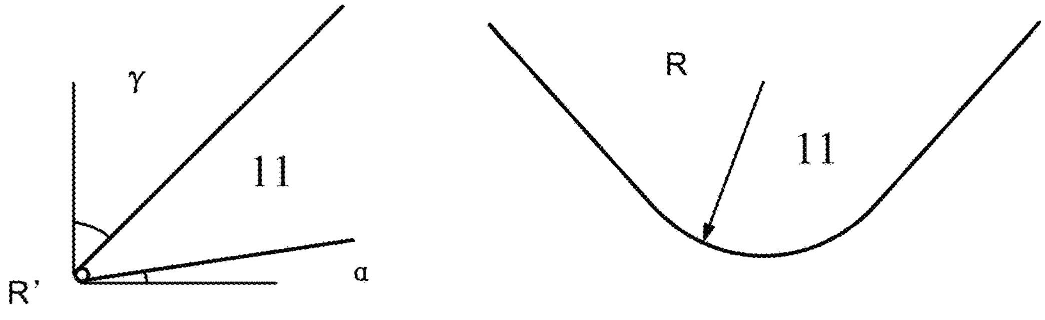
FIG. 5 is a schematic diagram of a parameter of a target cutter according to an embodiment of the present disclosure.

The parameters of the target cutter are illustrated in FIG. 5 and includes one or more of a rake angle γ, a clearance angle α, an edge radius R', a nose radius R, and a rake surface shape. When different types of metal surface microstructures are machined, a parameter adjustment is performed according to actual situations.

Figure 6:
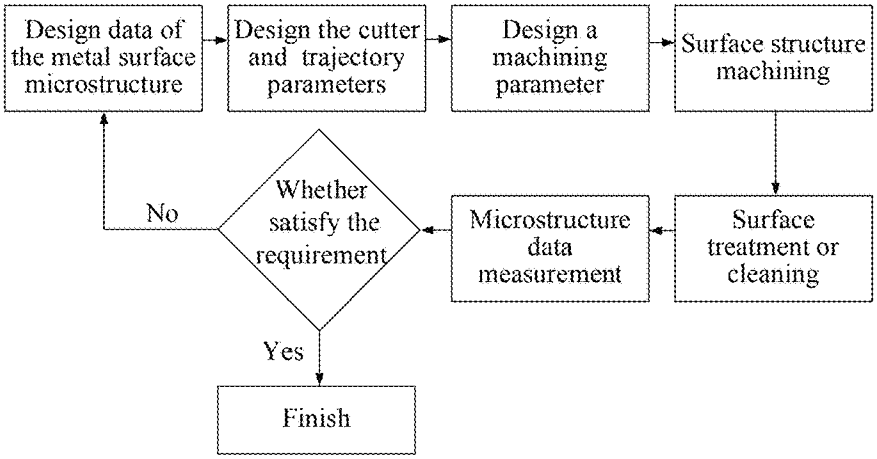
FIG. 6 is a schematic diagram of a machining process of cutting and machining a metal surface microstructure according to an embodiment of the present disclosure.

FIG. 6 shows a flowchart for cutting and machining a metal surface microstructure. Firstly, design data for the metal surface microstructure, i.e., what type of metal surface microstructure, distribution and requirements are required, is obtained. Based on the design data and machining mechanism, the target cutter and trajectory parameters are designed. machining parameters are determined. Subsequently, trial machining of a surface structure is carried out. After the trial machining is completed, surface treatment or cleaning is performed. Microstructure data is measured. When the microstructure data does not meet requirements, the previous parameters need to be adjusted, followed by retesting. When the microstructure data meets requirements, machining is completed, and a specific machining process for the metal surface microstructure is determined.

Further, in some embodiments, when the machining requirement of the current structure is the micro-post structure, the operation of performing, based on the machining parameter, the vibration parameter, and the vibration trajectory, cutting on the surface of the workpiece to be machined through controlling the target cutter by the predetermined vibration device to obtain the microstructure satisfying the machining requirement of the current structure includes: cutting, by the target cutter, into the surface of the workpiece to be machined and chiseling, by the target cutter, cutting chips to form a uniform micro-post structure in each vibration period, wherein: a vibration direction of the target cutter is perpendicular to a cutting feed direction of the target cutter during machining; and the vibration trajectory of the target cutter is along a straight line.

Figure 7:
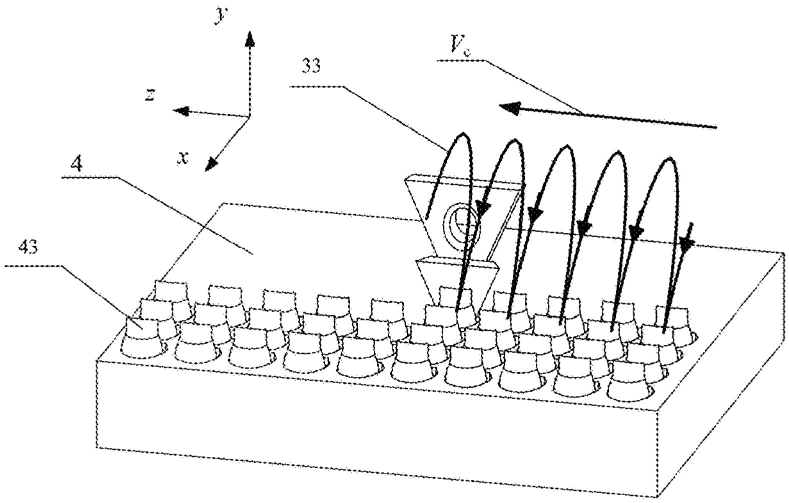
FIG. 7 is a schematic diagram of cutting and machining a micro-post structure according to an embodiment of the present disclosure.

In some embodiments of the present disclosure, FIG. 7 illustrates cutting and machining of a micro-post structure 43. During the cutting and machining of the micro-post structure 43, the vibration trajectory of the cutter is composed of vibration and coupling in the x-axis direction and the y-axis direction. It is assumed that a target cutter nose is the origin O of the coordinate system, and the machining coordinate system thereof is illustrated in FIG. 7. The target cutter is fed and moves in a Z-axis direction. At this time, a machining plane is perpendicular to a feed plane, i.e., the vibration direction of the target cutter is perpendicular to a cutting feed direction of the target cutter. In an X-Y machining plane, the morphology and pose of the elliptical vibration trajectory may be accurately adjusted by inputting piezoelectric stack signals and their phase differences. In order to enable a rake surface of the target cutter to lift the chips and form a post-like microstructure in combination with hollows, a phase difference of the elliptical vibration trajectory in an X-Y plane is 180°, allowing the trajectory to be presented as an inclined linear trajectory 33. In order to avoid excessive interference caused by a flank surface of cutter for the post-like microstructure, an inclination angle β of the slanted line should be smaller than the clearance angle of the cutter. The expression for this angle should be as follows:

$$\beta \geq \arctan(Y/X)$$

Figure 8:
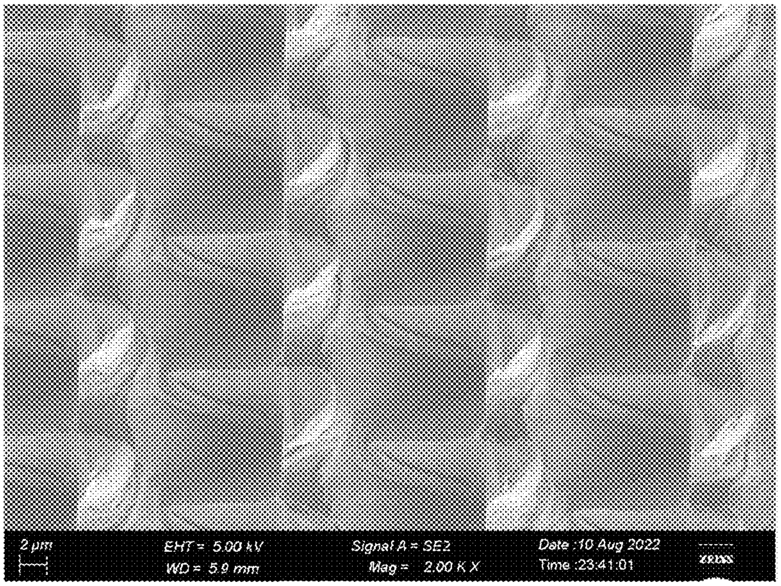
FIG. 8 is a schematic diagram of a real object of a scanning electron microscope of a machined micro-post structure according to an embodiment of the present disclosure.

For example, FIG. 8 shows a schematic diagram of a real object of a scanning electron microscope of a machined micro-post structure by using the vibration-chiseling machining method in the present disclosure. As illustrated in FIG. 8, the machining parameters are that the microstructure has a period length of 10 microns and a cutting depth of 4 microns. Parameters for a straight-line vibration trajectory are a semi-major axis of 4.5 microns and an inclination angle of 18°. The used target cutter is a sharp knife of a triangular shape and has a tip angle of 60°, a rake angle of 0°, and a clearance angle of 20°. The machined micro-post structure has a height of 8.9 microns, a width on its top of 4.3 microns, and a bottom width of 7 microns.

Further, in some embodiments, when the machining requirement of the current structure is the micro-rib structure, the operation of performing, based on the machining parameter, the vibration parameter, and the vibration trajectory, cutting on the surface of the workpiece to be machined through controlling the target cutter by the predetermined vibration device to obtain the microstructure satisfying the machining requirement of the current structure includes: cutting, by the target cutter, into the surface of the workpiece to be machined and chiseling, by the target cutter, cutting chips to form a uniform micro-rib structure in each vibration period, wherein: the vibration direction of the target cutter is opposite to the cutting feed direction of the target cutter during machining; and the vibration trajectory of the target cutter is an elliptical trajectory or a profiled trajectory.

Here, the profiled trajectory could be an ellipse, parallelogram, triangle, and so on.

Figure 9:
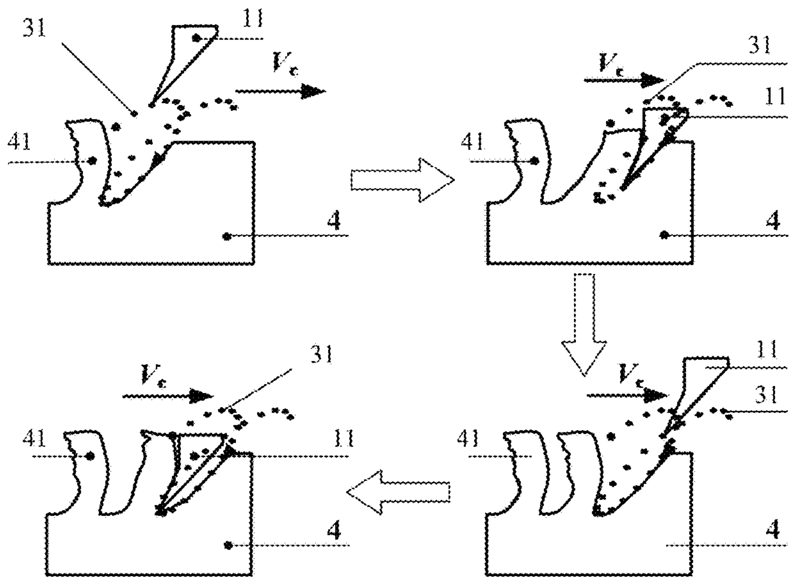
FIG. 9 is a schematic diagram of cutting and machining a micro-rib structure according to an embodiment of the present disclosure.

In some embodiments of the present disclosure, FIG. 9 shows a schematic diagram of cutting and machining a micro-rib plate. As illustrated in FIG. 9, an elliptical trajectory 31 is taken as an example. During machining of the target cutter 11, it starts by moving away from a workpiece 4 or the machined micro-rib structure 41, then starts from a machining starting point, cuts into a surface of the workpiece 4 in a feed direction of the target cutter 11 and pushes the micro-rib structure 41 to the left side. Gradually, the target cutter 11 penetrates deeper into the workpiece 4 and continues to push the micro-rib structure 41 to the left after reaching the deepest position. In this process, it should be noted that moving trajectory parameters of the target cutter 11 need to be adjusted in advance to prevent fracture of the micro-rib structure 41. Finally, when machining is completed, a surface micro-rib structure 41 having a certain depth-to-width ratio is formed on the surface of the workpiece 4, and then the target cutter 11 is away from the workpiece 4 and proceeds to the next cycle.

Figure 10:
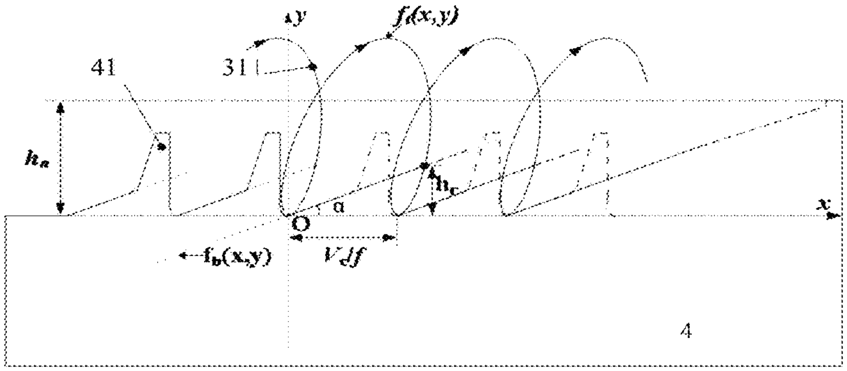
FIG. 10 is a schematic diagram of a moving trajectory of a target cutter when a micro-rib structure is cut and machined according to an embodiment of the present disclosure.

Further, FIG. 10 is a schematic diagram of a moving trajectory of a target cutter when a micro-rib structure is cut and machined. As illustrated in FIG. 10, a vibration direction of the target cutter is opposite to a cutting feed direction of the target cutter. As a novel machining technology, it is very necessary to establish a theoretical model of the vibration-chiseling machining method for machining the microstructure of the metal surface. Next, by taking machining of the micro-rib structure 41 of the metal surface as an example, a similar machining model for the microstructure is described. Under the elliptical trajectory 31, a rectangular coordinate system is established with O as the origin. In this way, the trajectory expression of the target knife is:

$$x = \sqrt{(a\cos\theta)^2 + (b\sin\theta)^2}\sin(2\pi ft + \varphi_x) + v_c t$$

$$y = \sqrt{(a\sin\theta)^2 + (b\cos\theta)^2}\cos(2\pi ft + \varphi_y)$$

where a represents the semi-major axis of the ellipse, b represents the semi-minor axis of the ellipse, θ represents an angle between the semi-major axis and an X-axis direction, $\varphi_x$ represents a phase angle of the target cutter in the X-axis direction, $\varphi_y$ represents a phase angle of the target cutter in a Y-axis direction, f represents the vibration frequency of the target cutter, $v_c$ represents a moving speed of the target cutter, and t represents the time. In addition, a comprehensive trajectory expression of the target tool in the ellipse can be formulated as:

$$f_t(x, y) = \sqrt{(a\cos\theta)^2 + (b\sin\theta)^2}\sin\left(\left(\cos^{-1}\frac{y}{\sqrt{(a\sin\theta)^2 + (b\cos\theta)^2}} - \varphi_y\right) + \varphi_x\right) + \frac{v_c}{2\pi f}\left(\cos^{-1}\frac{y}{\sqrt{(a\sin\theta)^2 + (b\cos\theta)^2}} - \varphi_y\right) - x$$

A trajectory expression of the flank surface of the target cutter is:

$$f_b(x, y) = y - x * \tan\alpha$$

Here, α represents the clearance angle of the target cutter.

It can be seen therefrom that a feature height of a certain point of intersection between the elliptical comprehensive trajectory and a rear knife trajectory is $h_r$, a spacing between intersection points is $I_r$, the feature height is approximately a surface microstructure height h in combination with the spacing between intersection points, and $V_c$/f is a period length of the surface microstructure. By increasing and matching the cutting speed and a vibration signal frequency of the external driving device, the machining efficiency can be improved, i.e., a higher number of microstructures machined in unit time is provided. In addition, by appropriately changing the rake angle γ and the clearance angle α of the target cutter and the inclination angle θ of trajectory, the above equations for the target cutter's moving trajectory and flank surface trajectory will also change. The feature height and the spacing between intersection points will also increase, corresponding to an increase in the surface microstructure height. Moreover, the depth-to-width ratio is increased. Meanwhile, the trajectory inclination angle is increased, and forming quality of the surface microstructure can also be improved.

In addition, the used target cutter may be made of diamond, but is not limited to this. A cutting edge may be in an arc shape or a straight-line shape. The clearance angle α and the rake angle γ of the used target cutter may be determined based on size parameters of the machined microstructure and the trajectory parameters of the target cutter. The clearance angle α should be greater than or equal to the inclination angle θ of the cutter trajectory. The elliptical trajectory of the target cutter may be generated by the predetermined vibration device based on a resonance or non-resonance principle, i.e., by the external driving device. The used vibration frequency is determined by capability of the vibration generation device and needs to be matched with a feed speed during machining, and the parameters are determined by the metal surface microstructure needing to be machined. As for a non-elliptical vibration trajectory, they can only be generated by a vibration generation device based on the non-resonance principle.

Figure 11:
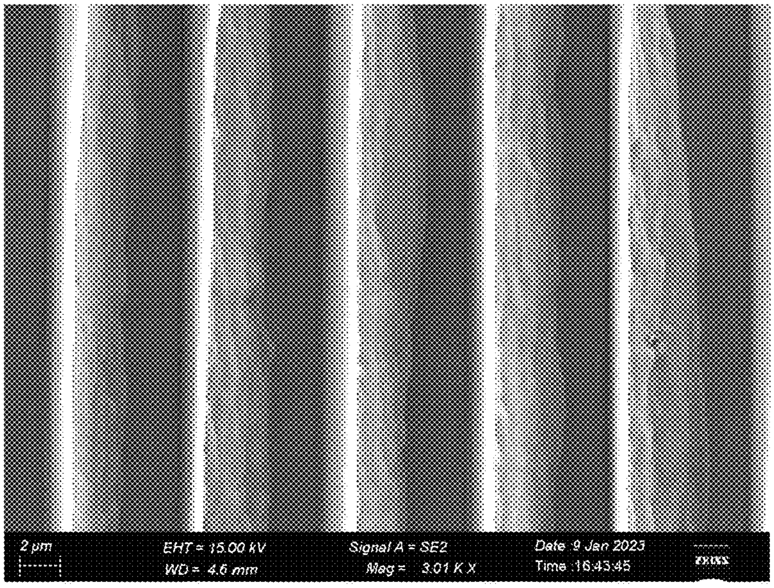
FIG. 11 is a schematic diagram of a real object of a scanning electron microscope of a machined micro-rib structure according to an embodiment of the present disclosure.

For example, FIG. 11 shows a schematic diagram of a real object of a scanning electron microscope of a machined micro-rib structure by using the vibration-chiseling machining method according to the present disclosure. The machining parameters are the period length of the microstructure of 7 microns and the cutting depth of the microstructure of 10 microns. The elliptical vibration trajectory parameters are the semi-major axis of 10 microns, the semi-minor axis of 3 microns, and the inclination angle of 20°. The used target cutter parameters are the arc radius of the cutter of 3 mm, the radius of the cutter tip of 50 nanometers, the rake angle of the cutter of 0°, and the clearance angle of 10°. The machined micro-rib structure has a height of 8.16 microns and a width of 2.825 microns.

Further, in some embodiments, when the machining requirement of the current structure is the microfiber structure, the method further includes, subsequent to chiseling the cutting chips to form the uniform micro-post structure or the uniform micro-rib structure: determining a new vibration trajectory and a new vibration parameter of the target cutter and forming a particulate structure based on a detached micro-post structure and the microfiber structure based on a detached micro-rib structure.

Figure 12:
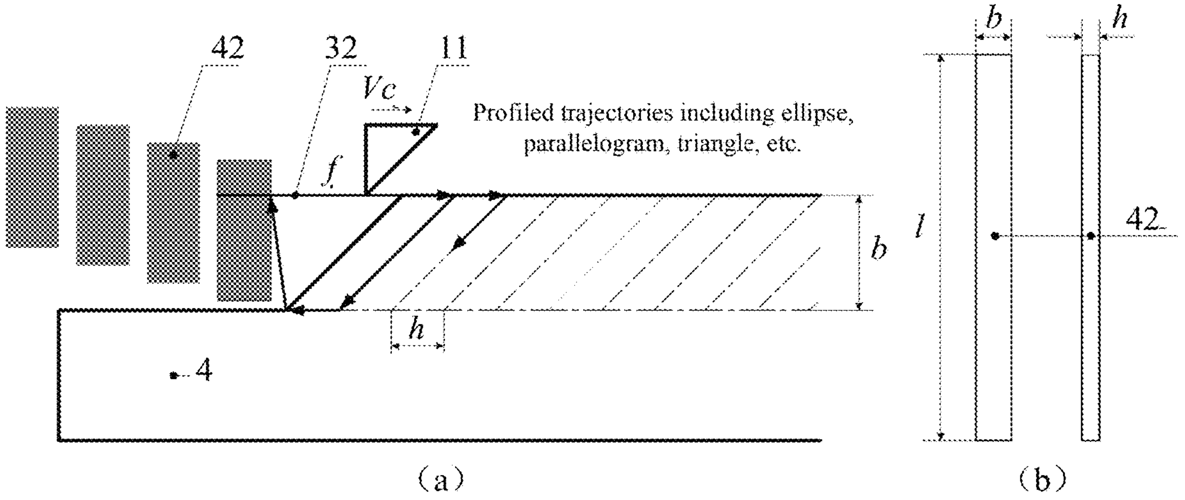
FIG. 12 is a schematic diagram of cutting and machining a microfiber structure according to an embodiment of the present disclosure.

In some embodiments of the present disclosure, cutting and machining of the microfiber structure are illustrated in FIG. 12. The vibration direction of the target cutter is opposite to the cutting feed direction of the target cutter. A uniform microfiber structure may be machined by using a profiled trajectory (like a parallelogram). By controlling and regulating the trajectory, fibers may be left on the surface to form a curved micro-rib structure or detached to form a short metal microfiber. Based on the machining parameters and the vibration parameters, the target cutter 11 is vibrated at a frequency f by using the predetermined vibration device. The vibration trajectory may be any trajectory, including but not limited to a case illustrated in FIG. 12(*a*), or may be synthesized by the vibration device. With a cutting depth of the cutter of b and a feed speed of $V_c$, the period length h is given by equation:

$$h = \frac{V_c}{f}$$

The target cutter 11 performs vibration cutting on a metal substrate, and cuts a layer of metal material with a thickness of b into the microfiber structure 42 having a uniform size and shape. By adjusting the parameters, the metal microfiber may be kept on the surface of the substrate or completely separated from the substrate. In one cycle, the target cutter 11 moves along its clearance angle α to uniformly separate unformed microfibers from the substrate, and then completely separates the unformed microfibers by transverse feed at the lowermost end. When a lateral movement length is smaller than a cycle length, the metal microfibers will remain on the surface of the substrate. As illustrated in FIG. 12(*b*), the size of the microfiber structure 42 includes a microfiber length l, a microfiber width b, and a microfiber thickness h. The shape of the microfiber structure 42 is determined by the shape, the vibration trajectory, the feed speed and the cutting depth b of the target cutter together, including but not limited to the shape illustrated in FIG. 12. The microfiber thickness h represents a cycle length of machining. The microfiber width b represents the cutting depth. The microfiber length l is determined by the cutting depth b and the arc radius r of the target cutter.

$$l = 2\sqrt{r^2 - (r-b)^2}$$

By matching the cutter, the vibration trajectory and the machining parameters, the required microfiber structure 42 is obtained. In addition, different microfiber structures can be machined in the same metal material by combining metal material attributes and machining parameters.

Figure 13:
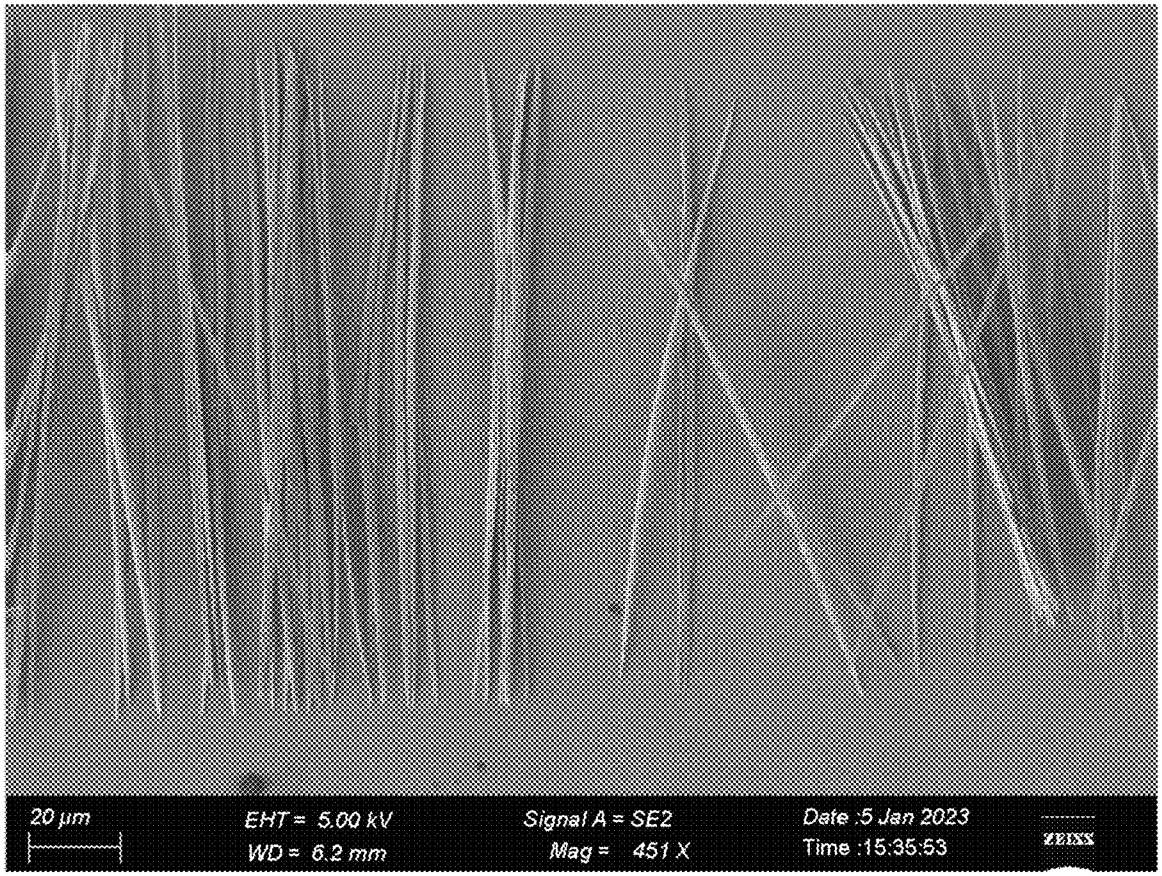
FIG. 13 is a schematic diagram of a real object of a scanning electron microscope of a machined microfiber structure according to an embodiment of the present disclosure.

For example, a schematic diagram of a real object of a scanning electron microscope of a machined microfiber structure by using the vibration-chiseling machining method of the present disclosure is illustrated in FIG. 13. The machining parameters are the period length of the microstructure of 2 microns and the cutting depth of the microstructure of 1 micron. The parallelogram vibration trajectory parameters are a base length of 14.7 microns, a height of 5 microns, and an inclination angle of 20°. The used target cutter parameters are the same as that of machining the micro-rib structure. The machined microfiber structure is separated from a copper surface to form the short metal microfiber with lengths ranging from tens to hundreds of microns and a thickness of 12 microns.

Further, in some embodiments, when the machining requirement of the current structure is the micro-V-shaped groove structure, the method further includes, subsequent to chiseling the cutting chips to form the uniform micro-post structure or the uniform micro-rib structure: forming, based on a predetermined profiling cutting scheme, the micro-V-shaped groove structure by transversely scoring a surface of the micro-post structure or a surface of the micro-rib structure.

Further, in some embodiments, the method further includes, subsequent to chiseling the cutting chips to form the uniform micro-post structure or the uniform micro-rib structure: forming, based on the predetermined profiling cutting scheme, the micro-pyramid structure by first transversely scoring and then longitudinally scoring the surface of the micro-post structure or the surface of the micro-rib structure.

That is, in this embodiment of the present disclosure, it is possible to freely manufacture a multi-level microstructure surface in combination with a predetermined profiling cutting scheme. For example, based on the predetermined profiling cutting scheme, by using a sharp knife for transversely scoring on the surface of the micro-post structure or the surface of the micro-rib structure, the micro-V-shaped groove structure can be formed, with its bottom as a second-level microstructure of the micro-rib structure or the micro-post structure; or based on the predetermined profiling cutting scheme, by using a sharp knife for first transversely scoring and then longitudinally scoring on the surface of the micro-post structure or the surface of the micro-rib structure, the micro-pyramid structure can be formed, with its bottom as the second-level microstructure of the micro-rib structure or the micro-post structure.

The micro-post structure, the microfiber structure, the micro-V-shaped groove structure, the micro-rib structure, and the micro-pyramid structure machined through the vibration-chiseling machining method provided by the embodiment of the present disclosure can be used in devices such as an enhanced heat exchange surface, an anti-icing surface, a bio-antibacterial surface, and an optical sensor mold.

With the vibration-chiseling machining method according to the embodiments of the present disclosure, the target cutter, the machining parameter, and the vibration trajectory and the vibration parameter of the target cutter may be determined based on the machining requirement of the current structure, and cutting is performed on the surface of the workpiece to be machined through controlling the target cutter by the predetermined vibration device based on the machining parameter, the vibration parameter, and the vibration trajectory, to obtain the microstructure satisfying the machining requirement of the current structure. Therefore, the vibration-chiseling machining method solves problems where the machining method has limitations in the efficient, high-flexible, large-batch, and cost-effective manufacturing of the metal surface microstructure currently, and where the reliable and resultful solution for manufacturing the large-scale high depth-to-width ratio metal surface microstructure is lacked, and the like. Therefore, the machining efficiency is improved and the machining effect is strengthened. Meanwhile, the costs are lowered.

In addition, the term "first" or "second" is only for descriptive purposes, rather than indicating or implying relative importance or implicitly indicating the number of indicated technical features. Therefore, the features associated with "first" or "second" can explicitly or implicitly include at least one of the features. In the description of the present disclosure, "plurality of" means at least two, such as two, three, etc., unless otherwise specifically indicated.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although the embodiments of the present disclosure have been shown and described, it would be appreciated by those skilled in the art that the above embodiments are exemplary and cannot be construed as limiting the present disclosure, and changes, modifications, substitutions, and variations can be made by those skilled in the art to the embodiments without departing from the scope of the present disclosure.

What is claimed is:

1. A vibration-chiseling machining method, comprising:

obtaining a machining requirement of a current structure;

determining a target cutter, a machining parameter, and a vibration trajectory and a vibration parameter of the target cutter based on the machining requirement of the current structure; and performing, based on the machining parameter, the vibration parameter, and the vibration trajectory, cutting on a surface of a workpiece to be machined through controlling the target cutter by a predetermined vibration device to obtain a microstructure satisfying the machining requirement of the current structure, wherein the machining requirement of the current structure comprises at least one of a micro-post structure, a microfiber structure, a micro-V-shaped groove structure, a micro-rib structure, and a micro-pyramid structure, wherein when the machining requirement of the current structure is the micro-post structure, said performing, based on the machining parameter, the vibration parameter, and the vibration trajectory, cutting on the surface of the workpiece to be machined through controlling the target cutter by the predetermined vibration device to obtain the microstructure satisfying the machining requirement of the current structure comprises:

cutting, by the target cutter, into the surface of the workpiece to be machined and chiseling, by the target cutter, cutting chips to form a uniform micro-post structure in each vibration period, wherein:

a vibration direction of the target cutter is perpendicular to a cutting feed direction of the target cutter during machining; and the vibration trajectory of the target cutter is along a straight line.

2. The vibration-chiseling machining method according to claim 1, wherein when the machining requirement of the current structure is the micro-rib structure, said performing, based on the machining parameter, the vibration parameter, and the vibration trajectory, cutting on the surface of the workpiece to be machined through controlling the target cutter by the predetermined vibration device to obtain the microstructure satisfying the machining requirement of the current structure comprises:

cutting, by the target cutter, into the surface of the workpiece to be machined and chiseling, by the target cutter, cutting chips to form a uniform micro-rib structure in each vibration period, wherein:

the vibration direction of the target cutter is opposite to the cutting feed direction of the target cutter during machining; and the vibration trajectory of the target cutter is an elliptical trajectory or a profiled trajectory.

3. The vibration-chiseling machining method according to claim 2, wherein when the machining requirement of the current structure is the microfiber structure, the method further comprises, subsequent to chiseling the cutting chips to form the uniform micro-post structure or the uniform micro-rib structure:

determining a new vibration trajectory and a new vibration parameter of the target cutter, and forming a particulate structure based on a detached micro-post structure and the microfiber structure based on a detached micro-rib structure.

4. The vibration-chiseling machining method according to claim 3, wherein when the machining requirement of the current structure is the micro-V-shaped groove structure, the method further comprises, subsequent to chiseling the cutting chips to form the uniform micro-post structure or the uniform micro-rib structure:

forming, based on a predetermined profiling cutting scheme, the micro-V-shaped groove structure by transversely scoring a surface of the micro-post structure or a surface of the micro-rib structure.

5. The vibration-chiseling machining method according to claim 4, further comprising, subsequent to chiseling the cutting chips to form the uniform micro-post structure or the uniform micro-rib structure:

forming, based on the predetermined profiling cutting scheme, the micro-pyramid structure by first transversely scoring and then longitudinally scoring the surface of the micro-post structure or the surface of the micro-rib structure.

6. The vibration-chiseling machining method according to claim 5, wherein the target cutter comprises a diamond cutter.

7. The method according to claim 6, wherein the machining parameter comprises at least one of a cutting speed, a cutting depth, and a cutting width.

8. The vibration-chiseling machining method according to claim 7, wherein:

the vibration trajectory is at least one of the elliptical trajectory, an oblique trajectory, and a parallelogram trajectory; and the vibration parameter comprises at least one of a vibration frequency, a vibration amplitude, a vibration direction, and a vibration phase.

* * * * *